Aug. 24, 1954

C. MOTT 2,687,466

METHOD OF WELDING OF COMPOSITE METAL

Filed June 24, 1952

Inventor
Chester Mott, Deceased, by
George A. Mott, Executor
By Schneider & Dressler,
Attys.

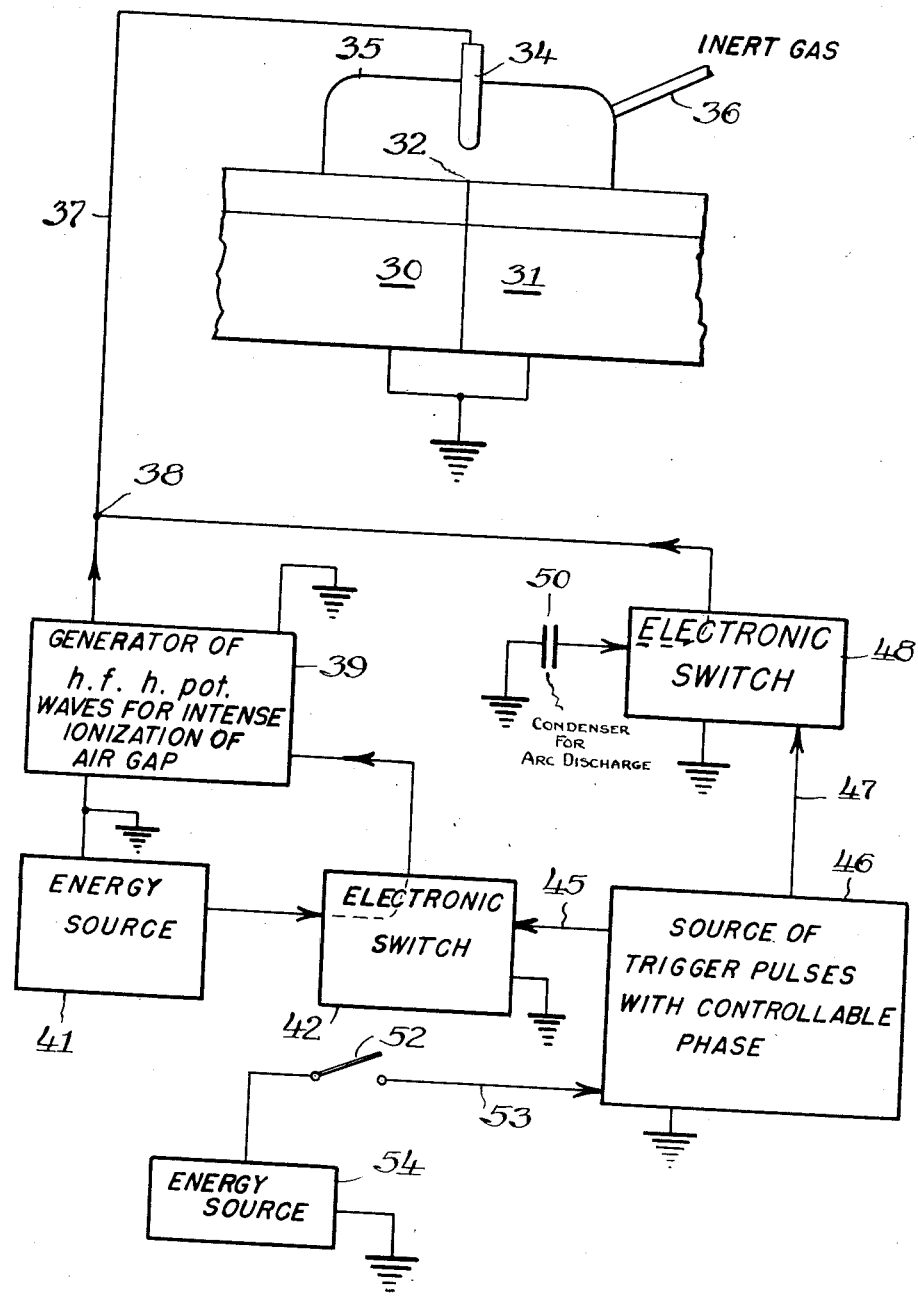

Patented Aug. 24, 1954

2,687,466

UNITED STATES PATENT OFFICE 2,687,466

METHOD OF WELDING OF COMPOSITE METAL

Chester Mott, deceased, late of Evanston, Ill., by George A. Mott, executor, Evanston, Ill., assignor to Fansteel Metallurgical Corporation, a corporation of New York Application June 24, 1952, Serial No. 295,305

8 Claims. (Cl. 219—10)

This invention relates to a method of butt welding sheets of composite metal. The method is particularly applicable to sheets consisting of two different metals bonded together to form a composite sheet, such metals having substantially different melting points.

Composite metals in sheet form are useful where vessels made of such metals face markedly different operating conditions on both sides of the sheet. Thus, for example, in many food and chemical operations it is desirable to fabricate vessels or pipes of copper-clad stainless steel. Other combinations of metals for special purposes may also be used. In particular, composite sheets of tantalum and other metal, such as stainless steel or nickel, for example, are finding specialized uses in certain fields. In the examples thus given, it is customary to have the tantalum sheet substantially thinner than the steel or nickel sheet, the ratio generally being of the order of about 1 to 5 or 6. These ratios are merely exemplary, may vary widely and are not involved in this invention.

Where composite metal sheets are required, such as for example, tantalum and nickel, it is clear that any weld or junction between abutting edges of such composite sheets should maintain the physical continuity and integrity of the metallic components of the sheets. In case where one metal component of a composite sheet has a melting point which is substantially different from the melting point of the other metal component of the composite sheet, difficulty in welding will occur. Thus, for example, tantalum has a melting point of about 3,000° C. and even then must be handled in such manner that contamination of the tantalum with other metals, or with gases, shall not occur. This is more fully disclosed and claimed in the copending application of Chester Mott, Serial No. 265,638, filed January 9, 1952.

Nickel, in contrast with tantalum, has a melting point of about 1455° C. and a boiling point which is lower than the melting point of tantalum. The disparity between the melting points of these two metals is more or less of an extreme example. However, other clad metals, such as for example, nickel-clad molybdenum would present substantially the same problem. Copper-clad stainless steel has about a 500° C. difference in the melting point of the stainless steel and copper components.

If welding technique for the more refractory metal of a composite sheet is used for welding such composite sheets, it will be apparent that the less refractory metal may be damaged, burned, or melted away so that it will be difficult, if not impossible, to maintain the composite nature of the sheet material at the weld. In the extreme example of tantalum and nickel, the temperature attained by a molten tantalum pool during welding is so far higher than the melting point of the nickel, that the continued existence of the nickel, as a separate metal, in the region of the weld ordinarily becomes a physical impossibility. Some of the nickel undoubtedly would be attracted by capillary action to the pool of tantalum and would result in a nickel-tantalum alloy on the tantalum side of the weld.

Even in those instances where the thickness of the nickel is much greater than that of the tantalum, as for example, 6 or even 10 to 1, damage to the nickel and substantial alloying of nickel with tantalum is still practically unavoidable. This arises from the fact that conventional continuous welding cannot be so accurately controlled that a relatively thin sheet of tantalum can be melted for welding without substantial penetration into the nickel and possible alloying therewith. Once the tantalum or other refractory metal has been satisfactorily welded, the welding of the nickel, or less refractory metal, becomes comparatively simple.

In accordance with this invention, the more refractory metal elements of composite sheets are welded by any suitable welding process utilizing precisely measured quantities of electricity applied over limited metal areas, as welding areas, in discrete welding steps. Thus, in the case of a tantalum-clad nickel butt weld, the abutting edges are welded in successive overlapping spots or regions along the line of weld to form a continuous weld. Each discrete welding step includes, as a part thereof, the application of a measured quantity of electrical energy for the production of a limited weld over a limited area and for a limited depth.

The energy necessary for effecting a weld is a function of the thickness of the weld to be made and area of the weld surface (the amount of solid material which has been melted for welding) apart from the purely physical factors of the nature of the materials being welded. For each welding cycle, by predetermining the quantity of energy to be applied to a weld at a predetermined region, the depth of penetration of the weld may be accurately controlled.

Thus, for example, in the case of tantalum-clad nickel, if small weld regions at the abutting edges are assumed to have certain surface areas of constant value and if a certain number of joules of electrical energy is impressed separately upon each weld region, then the penetration of the weld will attain a substantially definite constant value. The entire thickness of tantalum may be welded with substantially little or no penetration into the nickel.

Welding, under such conditions, may be considered as impressing transient thermal effects upon localized regions. The duration of such effects is generally extremely short in comparison to the time interval between successive welding cycles. As a result, the conductivity of tantalum and nickel for heat makes it possible to consider each welding cycle as being substantially independent of succeeding cycles and control accurately the nature of the weld. By overlapping such weld regions, a substantially continuous butt weld may be effected.

It is understood, of course, that some variation in penetration may result because of the variation in the nature of the gap between opposing edges to be welded. After the localized welding regions have been integrated to form a continuous butt weld of the tantalum, the nickel may be welded in any conventional manner. In the case of tantalum welding, it is understood that protection of the hot tantalum against contamination from the welding electrode may be desirable or necessary, this being more fully discussed hereafter.

For accurate control of the amount of electrical energy to be used in a weld, it is possible to isolate and store a discrete predetermined quantity of energy as potential energy and thereafter transform this potential energy into kinetic energy or heat energy for accomplishing an accurate and limited weld. It is also possible to switch a predetermined part of a cycle of alternating current on for an accurately measured time interval and thus use the current for welding.

Electrical energy in accurately measured quantities may be stored in either of two ways. Thus, electrical energy may be converted into electrostatic energy and stored in an electrical condenser from which such energy is readily available by discharging the condenser. Electrical energy may also be stored in the magnetic field of an electromagnetic device such as, for example, a simple inductance. Thus, an inductance carrying current has a certain amount of energy stored in the magnetic field. When this current is suddenly interrupted, the magnetic field collapses and the energy in the magnetic field is transformed into electrical energy.

For the carrying out of a welding cycle over a limited range, it is possible to use the energy stored in an electrical condenser and discharge such condenser to generate an arc at the welding region. To prevent contamination of the tantalum where tantalum is involved, it is necessary that the welding electrode be spaced from the tantalum at all times. Preferably, the welding electrode is of tungsten, although other materials such as tantalum may be used. Tungsten, however, is preferred because of its extremely high melting point, low vapor pressure and generally desirable properties as an arc electrode. It is preferred to provide means for ionizing the gap between the electrode and tantalum preliminary to the discharge of the condenser. Thus the entire amount of energy stored in the condenser will be available to generate an arc at a predetermined distance between the welding electrode and tantalum and no significant amount of energy will be expended in the ionization of the arc path.

Means for ionizing an arc path, preliminary to a welding arc, are well known and generally involve the application of momentary surges of high potential at high frequency. Thus, one example of a welding system which may be used in the practice of the present invention is disclosed in the copending application of John M. Frank, Serial No. 262,134, filed December 17, 1951, and assigned to the same assignee as the instant application. Other systems, however, may be used and it is even possible to use the potential energy in the condenser for both the ionization and generation of the arc. Within small limits, the energy necessary for ionizing the gap, preliminary to an arc discharge, is fairly constant. It is also possible to use as a welding electrode a material having some radioactive component therein, which component will serve to ionize the gap.

It is also possible to use the energy stored in a magnetic field or use a predetermined part of an alternating current cycle for accomplishing one weld cycle. Where the electrode must remain physically separated from the work (as with tantalum, for example) it is desirable to ionize initially the gap after which the electric arc discharge can occur. In general, high frequency electric oscillations at suitable potential or radioactive electrode components may be used for ionization.

For uniformity, it is important that electrode spacing from the work (or if the electrode contacts the work, then pressure of the electrode upon the work) be constant. Thus the amount of arc energy useful for a weld cycle will remain constant.

In all cases, the composite sheets forming the work should have good electrical connections to the arc circuit so that the heating effects will be concentrated on one side of the sheets.

For a more complete disclosure of the invention, reference will now be made to the drawings wherein there are shown some examples of systems with which the method may be practiced, it being understood that such showings are exemplary.

Referring to the drawings:

Figure 3 is a diagrammatic showing of a welding system with which the method may be practiced.

Figure 1:
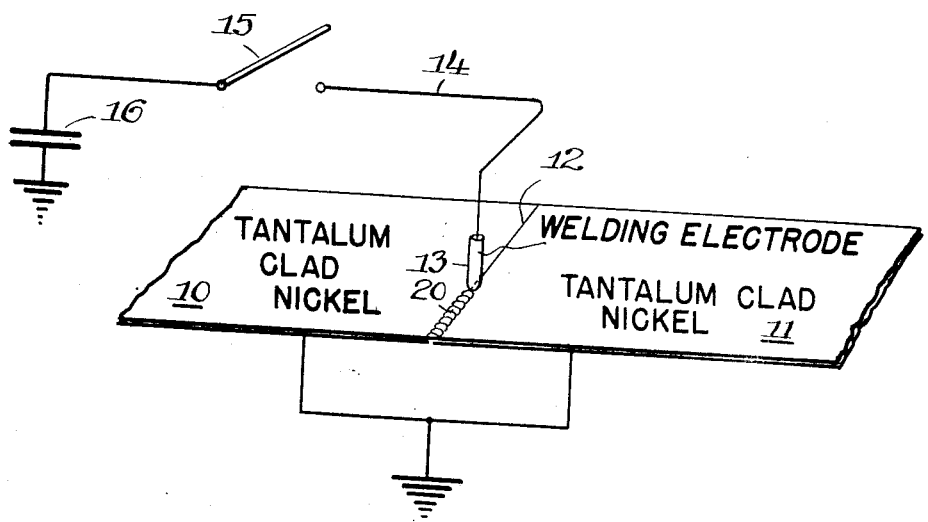
Figure 1 is a diagrammatic showing of a simple system with which the method may be practiced.
Figure 2:
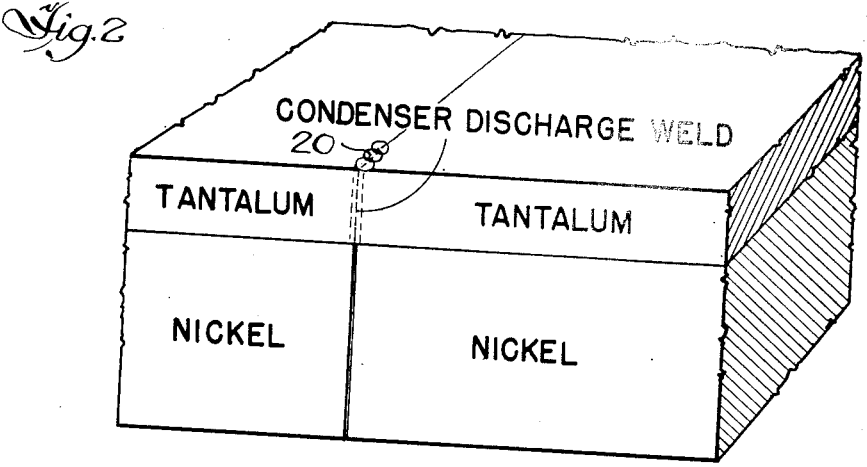
Figure 2 is a perspective detail of two pieces of tantalum clad nickel with the tantalum portion welded.

Referring first to Figures 1 and 2, pieces 10 and 11 of composite metal are to be welded along line 12. As illustrated in the drawing, pieces 10 and 11 are tantalum-clad nickel. However, they may be any composite metal sheets wherein the two metals making up the composite sheets have substantially different melting points.

In order to weld sheets 10 and 11 along line 12, it is necessary to weld the abutting edges in two separate operations. Thus, in the case of tantalum-clad nickel, the butt welding of the tantalum will be a completely separate operation from the butt welding of the nickel. While it is preferred to weld the tantalum first and then weld the nickel later, the sequence of the two operations may be reversed. In general, the same considerations will apply to other composite sheets such as copper-clad stainless steel or tantalum-clad stainless steel or any other combinations of metal sheet having substantially different melting points.

Sheets 10 and 11 are disposed in abutting relation in customary manner and may be maintained in predetermined relation by clamps or any other suitable means as in conventional butt welding. Sheets 10 and 11 are connected to ground as shown, these sheets forming one pole of an arc-welding system. The ground connection to sheets 10 and 11 should be good enough so that the heating effects of the current will be concentrated at the top part of the sheets. Electrode 13 forms the welding electrode and this electrode is connected by wire 14 to one pole of switch 15. Switch 15 has its other pole connected to grounded condenser 16.

Where tantalum is one of the metals of a clad metal sheet, special precautions and procedures are necessary to insure a satisfactory weld. As more fully described in the copending application of Chester Mott as previously identified, the welding of tantalum must be accomplished in a protected inert atmosphere. Furthermore, in order to avoid contamination of the tantalum, it is necessary to have the welding electrode physically spaced from the tantalum and it is preferred to use, as welding electrodes, such metals as tungsten or tantalum.

The copending application of Chester Mott referred to above is concerned with continuous welding of tantalum and thus involves the most severe conditions to be encountered. In the practice of the method forming the subject matter of this invention, the welding is divided into small welding cycles. Hence considerations of gas flow of inert atmosphere, refractory nature of the welding electrode, polarity of the welding electrode and retention of the tantalum work pieces do not apply to a great extent here as in the continuous welding. Thus, an inert atmosphere of helium, for example, or any one or a mixture of the rare monatomic gases, should preferably be maintained around the welding discharge region. However, due to the fact that the discharge time for each welding cycle is relatively short, it may be possible to dispense with a protecting atmosphere of monatomic gas and use other gases, such as air, nitrogen, or any other gas, or even use a region of reduced gas pressure to minimize gas absorption. Since tantalum tends to react with ordinary gases, such as air, nitrogen and the like, at temperatures of about 400° C., and since welded regions along junction 12 may be above 400° C. for a short time after the passage of the welding electrode, it may be generally desirable to have electrode 13 of tungsten, or tantalum, and utilize an enveloping atmosphere of helium or other rare gas and to maintain the welded joint in such atmosphere until its temperature has dropped to a safe value.

In the case of metals other than tantalum, where contamination is not a serious problem, conventional electrodes may be used and it may even be possible to have the welding electrode physically contact the region to be welded.

In the specific example disclosed, however, where tantalum is being welded, physical spacing between welding electrode 13 and the work is preferred. The amount of physical spacing and constancy of electrode area are two factors in welding cycles. It is desirable that these two factors remain substantially constant over welding cycles.

In the simple system illustrated in Figure 1, condenser 16 will have to be charged to a sufficiently high potential, by means not shown, so that upon closure of switch 15, ionization of the gap between welding electrode 15 and the work will occur and thereafter be followed by a disruptive arc discharge. In practice, condenser 16 may be a bank of condensers whose total capacitance may run into hundreds of microfarads.

In order to reduce the potential to which condenser 16 need be charged, it is possible to have the tip of welding electrode 13 made of suitable material having a low work function or of radioactive material which will ionize the air. Thus, for example, materials having a low work function, such as alkaline earth carbonates, are well known in the art of making hot and cold cathodes for gas discharge tubes. Where such an expedient is relied upon, it will be necessary to have the welding electrode as cathode. Since this is generally undesirable because of the greater consumption of electrode material, it may be preferable to use radioactive material in the welding electrode. In either case, the potential to which condenser 16 should be charged need be just great enough to initiate an arc discharge in an ionized gap. Such potential is generally substantially lower than the potential necessary to ionize, and hence will effect decided economies in condensers.

It is understood that after welding electrode 13 is positioned properly above the weld line, switch 15 will be closed and a welding cycle will therefore occur. At the completion of the cycle, switch 15 will be opened, condenser 16 will be recharged and welding electrode 13 will be advanced along the weld line. As shown in the drawing, differential areas 20 are welded, one area being welded per welding cycle. The size of one area 20 will, as herein before pointed out, be a function of the electrical energy available for a welding cycle and the amount of metal present. In general, adjacent differential areas 20 should overlap sufficiently so that a continuous weld along the abutting edges of the tantalum throughout the thickness thereof will occur.

As shown in Figure 2, the penetration of weld along line 12 may be adjusted so that only the tantalum is welded and the nickel is substantially untouched. It may be desirable to adjust the penetration of the weld so that some slight welding or alloying at the interface between nickel and tantalum will occur and provide a bridge across the abutting edges. If the nickel has not been welded already, a protecting layer of nickel or tantalum-nickel alloy will be formed on the inside face of the tantalum layer. Thus, the nickel may be welded later in conventional manner without regard to the tantalum. It is understood, if the tantalum tends to rise above 400° C. during the nickel welding, that means to protect the tantalum against contamination may be necessary. In practice, the mere resting of the tantalum upon some solid support, such as sheet iron, or copper, or glass, will suffice to prevent access of significant quantities of gas to the tantalum surface.

Referring now to Figure 3, there is shown an electrical system more fully described and claimed in the copending application of Frank, previously identified. Thus, referring to Figure 3, sheets 30 and 31 are to be welded along line 32. Each sheet 30 is composite in nature. The two sheets 30 and 31 are grounded as shown. Cooperating with the sheets is welding electrode 34 which may be of tungsten or tantalum in the event that tantalum is one of the components of the composite sheets. Welding electrode 34 is surrounded by welding hood 35 of any suitable material. Hood 35 has gas inlet 36 supplied from any suitable source with an inert gas at a low pressure. The pressure is preferably slightly above atmospheric pressure. Leakage of inert gas from hood 35 to atmosphere will suffice to maintain the inert nature of the atmosphere around the welding region. The requirements for control of gas flow and the like which obtain in continuous tantalum welding, as more fully disclosed and claimed in the copending application of Chester Mott, are of little concern here. Due to the short duration of each arc discharge, the problem of chilling of the pool of tantalum does not arise.

Electrode 34 is connected by wire 37 to junction 38, and connected to junction 38 is generator 39 for supplying high-frequency, high-potential waves for a short period of time per welding cycle. Thus, generator 39 is provided to ionize initially the gas between electrode 34 and the work. Since ionization can occur in a matter of several microseconds at the most, generator 39 need only have an output for a comparatively short duration of time such as one or several microseconds. Generator 39 may be any one of a number of devices, such as a continuous oscillator or the type which generates damped trains of waves such as a spark-gap type of oscillator. Inasmuch as generators of high-frequency, high-potential waves are well known, a detailed description is not deemed to be necessary.

Generator 39 has its output connected to junction 38 and ground. This generator has an input circuit connected to energy source 41 and electronic switch 42. Energy source 41 may be either a battery or a conventional source of power for providing energy to generator 39. Energy source 41 has one terminal grounded and the other terminal connected to electronic switch 42. The switch circuit goes from energy source 41 through switch 42 when closed, or conducting, to generator 39. Electronic switch 42 may be any one of a number of vacuum or gas discharge devices adapted to control current. Thus, electronic switch 42 may be a simple vacuum tube having three or more electrodes or may be a grid-controlled gas discharge tube or thyratron or a mercury arc device of the ignitron type.

Electronic switch 42 is normally open and is connected by wire 45 to 46 which is a source of trigger pulses. Pulse source 46 is connected by wire 47 to supply pulses to electronic switch 48 which, in general, may be similar to switch 42. Electronic switch 48, however, should be capable of carrying heavy currents for short periods of time. This switch is connected between junction 38 and grounded condenser 50 so that the arc current passes through the switch when the switch is closed or in a conducting condition.

As more fully disclosed in the copending application of Frank, it is preferred to have the trigger pulses in line 45 slightly advanced in phase to the pulses in 47. In practice, switches 42 and 48 are normally open and are closed by one pulse each, such pulse having suitable magnitude and polarity. Inasmuch as ionization of the welding region must precede the arc discharge, the phase displacement between a trigger pulse in line 45 and the corresponding trigger pulse in line 47 may be of the order of about one or two microseconds. The phase should be just enough so that the arc discharge can occur upon optimum ionization conditions. This may be determined by simple experiment and it is understood that suitable means for adjusting the phase between pulses will be provided.

Pulse source 46 is controlled by manual switch 52 connected by wire 53 to pulse source 46. Switch 52 is connected to energy source 54, the control circuit being completed to ground.

The operation of Figure 3 will now be explained. Upon closure of switch 52, pulse source 46 will send out a pulse along wires 45 and 47. Electronic switches 42 and 48 will be closed in succession, switch 42 being closed prior to switch 48. The closure of switch 42 will cause generator 39 to ionize the welding region and the closure of switch 48 will permit charged condenser 50 to discharge between electrode 34 and weld 32. After the discharge, switch 52 will be open and condenser 50 will be charged by suitable means. Means may be provided for relatively moving the welding electrode and the work to obtain a series of overlapping regional welds, or the movement may be effected by hand.

In the Frank application previously referred to, there is disclosed a specific system based upon the generalized block diagram shown in Figure 3. This specific system may be used. Instead of the switch being closed by the movement of electrodes as in the Frank application, a simple manual switch may be provided and the welding electrode in this instance maintained at a constant spacing from the work, although movable along the work to advance the weld.

Other means for obtaining a disruptive controlled discharge between spaced electrodes may be used.

What is claimed is:

1. In the method of butt welding two composite metal sheets, each composite metal sheet consisting of two layers of different metals permanently bonded, said two different metals having melting points which differ so much that the refractory metal cannot be maintained in a weldable condition when subjected to the normal welding temperature for the more refractory metal, the steps of welding the more refractory metal which comprises disposing an arc welding electrode in predetermined relation to the work to define a limited weld region, discharging a measured quantity of electric energy between said electrode and the work to create a momentary arc at said weld region, said energy being proportioned so that the momentary arc butt welds the more refractory metal together over said weld region for a limited depth, displacing the metal sheets with reference to the electrode so that a succeeding but overlapping new weld region is selected, the new weld region being similar to the adjacent region, and repeating the weld steps, whereby a number of adjacent overlapping weld regions are integrated to form a substantially continuous weld of the more refractory metal without substantial damaging effects upon the less refractory metal, and thereafter welding the less refractory metal in conventional manner.

2. In the method of butt welding two composite metal sheets, each composite metal sheet consisting of two layers of different metals permanently bonded, said two different metals having melting points which differ so much that the less refractory metal cannot be maintained in a weldable condition when subjected to the normal welding temperature for the more refractory metal, the steps of welding the more refractory metal which comprises positioning a welding electrode in predetermined position with respect to a selected weld region, storing a predetermined quantity of energy, converting said energy into electric energy and discharging said predetermined quantity of electric energy to create an arc at the weld region to complete a welding cycle, changing the relative position of said electrode and sheets to select a new but similar welding region, the new welding region overlapping the adjacent welding region, and repeating the welding cycle, said electrical energy being proportioned so that the weld depth is substantially limited to the more refractory metal whereby a substantially continuous weld between the more refractory layers is provided, and thereafter welding the less refractory metal in conventional manner.

3. In the method of butt welding tantalum-clad metal with the other metal having a melting point so much lower than tantalum that the other metal cannot be maintained in a weldable condition when subjected to the normal welding temperature for tantalum, the steps of welding the tantalum which comprises disposing an inert electrode in predetermined spaced relation to the weld region, discharging a measured amount of electrical energy between said electrode and work at said weld region to create a momentary arc at the weld region, the weld region and measured electrical energy being selected so that weld penetration is substantially limited to the tantalum, changing the relative position of said electrode and work to select a succeeding weld region, the succeeding weld region overlapping the adjacent weld region and the electrode spacing being substantially the same as before, and repeating the welding steps so that a series of overlapping weld regions results with the weld depth being substantially equal to the thickness of tantalum, and thereafter welding the other metal in conventional manner.

4. In the method of butt welding tantalum-clad metal with the other metal having a melting point so much lower than tantalum that the other metal cannot be maintained in a weldable condition when subjected to the normal welding temperature for tantalum, the steps of welding the tantalum which comprise storing a predetermined quantity of energy, transforming said stored energy into electrical energy, discharging said electrical energy in the form of an arc of predetermined dimension over a predetermined weld area to complete a welding cycle, and repeating said welding cycle over a different but overlapping weld area, said energy being so proportioned that the weld depth is substantially equal to the tantalum thickness, and thereafter welding the other metal in conventional manner.

5. In the method of butt welding tantalum-clad nickel, the steps of welding the tantalum without substantial damage to the nickel, which comprises discharging a measured amount of electrical energy to create a momentary arc at the weld region, and repeating the same at a different but overlapping weld region, the arc energy being proportioned so that the weld depth is substantially equal to the thickness of the tantalum, the overlapping weld regions forming a substantially continuous weld region, and thereafter welding the other metal in conventional manner.

6. In the method of butt welding tantalum-clad nickel, the steps of welding the tantalum which comprises storing a predetermined quantity of energy, transforming said energy into electrical energy and discharging the same to create a momentary arc at a limited weld region, thus forming a complete welding cycle, and repeating said welding cycle at a different weld region, the energy for each weld cycle being proportioned so that the weld is substantially equal to the tantalum thickness at each weld region, and thereafter welding the other metal in conventional manner.

7. In the method of butt welding two composite metal sheets, each composite metal sheet consisting of two layers of different metals permanently bonded, said two metals having melting points which differ so much that the less refractory metal cannot be maintained in a weldable condition when subjected to the normal welding temperature for the more refractory metal, the steps of welding the more refractory metal which comprises storing a predetermined quantity of energy in an electrical condenser, discharging said condenser to create a momentary arc at a limited weld region, thus forming a welding cycle, and repeating the welding cycle at new weld region, the energy stored in said condenser being predetermined so that for the weld region, the weld depth is substantially equal to the thickness of the more refractory metal, and thereafter welding the less refractory metal in conventional manner.

8. In the method of butt welding two composite metal sheets, each composite metal sheet consisting of two layers of different metals permanently bonded, said two different metals having melting points which differ so much that the less refractory metal cannot be maintained in a weldable condition when subjected to the normal welding temperature for the more refractory metal, the steps which comprise disposing a welding electrode in predetermined position with respect to the weld line for selecting a limited weld region, ionizing any gas between the weld line and electrode, discharging a measured quantity of electricity in the form of an arc between said welding electrode and work over said limited weld region to thereby complete a welding cycle, and repeating said welding cycles for other weld regions along the line of weld, the arc energy being proportioned so that the weld depth is substantially limited to the thickness of the more refractory metal, and thereafter welding the less refractory metal in conventional manner.

References Cited in the file of this patent

UNITED STATES PATENTS

| Number | Name | Date |
| --- | --- | --- |
| 2,083,234 | Larson | June 8, 1937 |
| 2,158,799 | Larson | May 16, 1939 |
| 2,173,450 | Larsen | Sept. 19, 1939 |
| 2,177,868 | Chapman | Oct. 31, 1939 |
| 2,198,331 | Chyle | Apr. 23, 1940 |
| 2,294,650 | Bechtle | Sept. 1, 1942 |